March 31, 1970  HUNG CHI CHANG ET AL  3,504,181
SILICON CARBIDE SOLID STATE ULTRAVIOLET RADIATION DETECTOR
Filed Oct. 6, 1966  5 Sheets-Sheet 1

WITNESSES
Theodore F. Wrobel
Donald M. Winegar

INVENTORS
Hung Chi Chang, Robert B. Campbell
and Marvin L. Crull
BY
C. L. Menzemer
ATTORNEY

ced mar. 31, 1970

United States Patent Office 3,504,181
Patented Mar. 31, 1970

3,504,181
SILICON CARBIDE SOLID STATE ULTRAVIOLET RADIATION DETECTOR
Hung Chi Chang, Robert B. Campbell, and Marvin L. Crull, Pittsburgh, Pa., assignors to Westinghouse Electric Corporation, Pittsburgh, Pa., a corporation of Pennsylvania
Filed Oct. 6, 1966, Ser. No. 584,797
Int. Cl. G01t 1/16; H01j 39/00, 39/12
U.S. Cl. 250—83.3
9 Claims

ABSTRACT OF THE DISCLOSURE

An ultraviolet radiation detection system comprising a body of silicon carbide semiconductor material having a top surface and a bottom surface. The silicon carbide body has at least one region of a first type semiconductivity, at least one region of a second type semiconductivity, and a p-n junction formed by the interface of each pair of regions of different type semiconductivity. At least a portion of the p-n junction closest to the top surface of the body is no greater than 10 microns from the top surface whereby that portion is sensitive only to a predetermined wavelength within the ultraviolet radiation portion of the spectrum when the top surface of the device is exposed to a source of radiation.

---

This invention relates to a silicon carbide ultraviolet radiation detection device.

Ultraviolet radiation detectors are often required to operate in hostile ambients such, for example, as high temperatures and oxidizing atmospheres. Often the value of the detectors is enhanced if the detector is sensitive only to radiation of a given range of energies. In applications where the detection of combustion is important, the detector should be responsive to ultraviolet radiation and insensitive to visible and infrared radiation.

Additionally, prior art ultraviolet wavelength flame scanners employed in detecting the presence or absence of a burner flame in a furnace or boiler require 700-volt electrical leads to the furnace or burner.

An object of this invention is to provide an ultraviolet radiation detector device capable of sustained operation at high temperatures.

Another object of this invention is to provide an ultraviolet radiation detection device which is relatively less sensitive to visible and infrared radiation and capable of sustained operation at high temperatures.

Another object of this invention is to provide a process for making a silicon carbide ultraviolet radiation detector device which is relatively less sensitive to visible and infrared radiation.

A further object of this invention is to provide an ultraviolet radiation detection system which is relatively less sensitive to visible and infrared radiation, capable of sustained operation at high temperatures and requiring low voltage electrical leads to a combustion chamber being monitored.

Other objects of this invention will, in part, be obvious and will, in part, appear hereinafter.

For a better understanding of the nature and objects of the present invention, reference should be had to the following detailed description and drawings, in which.

In accordance with the present invention and in attainment of the foregoing objects, there is provided a solid state ultraviolet radiation detector device consisting of a body of silicon carbide semiconductor material having a top surface and a bottom surface; a first region of first type semiconductivity, the first region consisting of at least a portion of the top surface; a second region of second type semiconductivity; and a p-n junction formed between the first region and the second regions; the p-n junction being disposed at a distance no greater than 10 microns from the top surface of the body whereby the p-n junction is sensitive only to a predetermined wavelength with the ultraviolet radiation portion of the spectrum when the top surface of the device is exposed to radiation.

Figure 1:
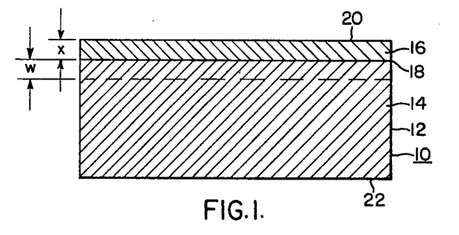
FIGURE 1 is a view in cross section of a radiation detection device embodying the teachings of this invention.

With reference to FIG. 1, there is shown a silicon carbide ultraviolet radiation detecting device 10.

The device 10 comprises a body 12 of silicon carbide semiconductor material. The body 12 has a first region 14 of first type semiconductivity, a second region 16 of second type semiconductivity and a p-n junction 18 at the interface between the regions 14 and 16. The p-n junction 18 is located at a distance $x$ beneath a top surface 20 of the body 12.

The intensity of transmitted radiation at the surface 20 is designated as being $I_0$. Assuming that absorbed photons from the transmitted radiation have sufficient energy to give rise to band-to-band transitions, each absorbed photon gives rise to one or more electron hole pairs. When the transit time across the depletion layer in the first region 14 is less than the carrier lifetime, the assumption is that the largest part of the electron-hole pairs will be collected. Silicon carbide has a relatively short minority carrier lifetime, therefore excitation processes outside the depletion layer may be neglected to a first order approximation.

The relationship between the junction depth $x$, the wavelength $\lambda$, of the incident radiation and the temperature dependence of the peak response wavelength, $\lambda_p$, as a function of temperature can be obtained by using Lambert's law, which defines the intensity of radiation at the p-n junction 18 $I(\alpha, x)$ as follows:

$$I(\alpha, x) = I_0 \exp(-\alpha x) \tag{1}$$

and the data of Choyke and Patrick, W. J. Choyke and Lyle Patrick, Proc. Conf. on SiC, p. 306, Boston 1959, Pergamon Press, New York, 1960, on the absorption coefficient of SiC as a function of incident photon energy. In Equation 1, $I_0$ is the intensity of transmitted radiation at the surface 20, $\alpha$ is the absorption coefficient and $x$ is the junction depth.

This treatment leads to two equations. The first relates to the junction depth $x$ to the absorption coefficient $\alpha$ and the width of the effective depletion region W, vis.

$$X = \frac{W \exp(-\alpha W)}{1 - \exp(-\alpha W)} \quad (2)$$

The second equation relates to the temperature dependence of the peak response wavelength, $$\frac{d\lambda_p}{dt} = 2.65 \times 10^{-8} x^2 \frac{1}{(\text{A. deg.})} \quad (3)$$

Figures 2, 4, 5, 6:
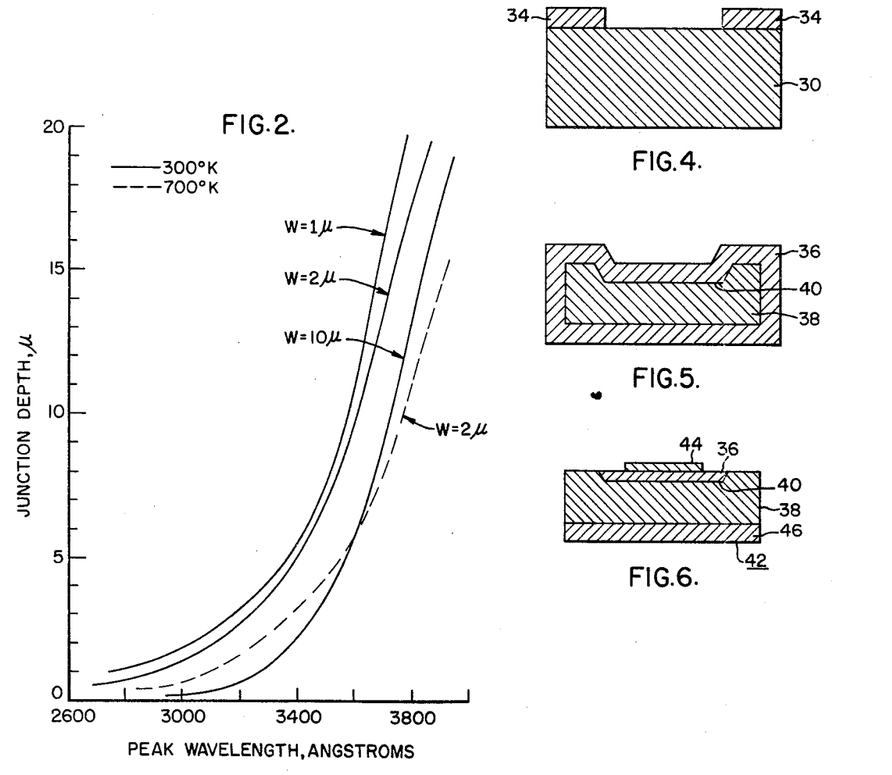
FIG. 2 is a plot showing the calculated variation of the peak wavelength with respect to the junction depth at 300° K. and 700° K.
FIGS. 3 through 6 are views in cross section of a device being prepared in accordance with the teachings of this invention.

FIG. 2 is a graphic illustration of the variation of the peak response wavelength $\lambda_p$ with the junction depth $x$ for various temperatures. The response peak varies less with a temperature change for a shallow junction than for deeper junction devices.

Silicon carbide detection devices which function in accordance with the aforementioned derived equations are preferably made from bodies of silicon carbide having n-type semiconductivity. N-type semiconductivity silicon carbide is preferred since diffusion processes are better known and controlled than are now available for p-type semiconductivity material.

The bodies of silicon carbide have a resistivity of from 0.1 to 100 ohm-centimeters. A resistivity of 1 ohm-centimeter is preferred.

A p-type region of semiconductivity is formed in, and includes the top surface 20 of the body. The resulting structure of the device is as shown in FIG. 1, the region 16 being the p-type region and the region 14 the n-type region of the body 12 of silicon carbide. The region 16 is formed by diffusing hyper-pure aluminum, or other suitable doping material, through the top surface 20 into the body 12 or by growing a p-type doped layer on the surface. The depth $x$ of the region 16 varies from less than one (1) micron to a maximum of 10 microns, with a 3 micron depth being preferred.

As the junction depth increases, the peak response wavelength $\lambda_p$ also increases, that is to say, the peak response occurs at longer wavelengths. When the p-n junction 18 depth $x$ is much greater than 6–8 microns, relatively little change occurs in the peak response detected by the device 10. When the p-n junction 18 depth $x$ is approximately 1 to 2 microns, a relatively small change in the junction depth $x$ causes a large change in the peak response wavelength $\lambda_p$. Therefore, when one is manufacturing the device 10 extreme care must be exercised to produce the proper depth $x$ for the region 16 in order to obtain the peak response for the wavelength desired.

Since a peak response near 2850 A. requires the p-n junction 18 depth $x$ to be less than one (1) micron, the making of the region 16 must be very accurately controlled. The removal of excess material from the surface 20 in order to obtain a desired depth $x$ may be accomplished by such suitable means as by oxidation, electrolytic etching and chemical etching, and a combination of oxidation and chemical etching.

One preferred method of removing material from the surface 20 is the employment of a combination oxidation and chemical etching process. The material of the surface 20 is first oxidized by causing a suitable water saturated gas such, for example, as argon, oxygen or nitrogen to flow across the surface 20 at a temperature of from 900° C. to 1200° C. As a result of this process a portion of the silicon carbide of the region 16 is oxidized to silicon oxide. The silicon oxide is subsequently removed by chemical etching, such, for example, by hydrofluoric acid. The oxidation-chemical etching process is repeated as often as is necessary until all the material required to be removed from the surface 20 has been removed.

The rate of oxidation of the material comprising the surface 20 follows the well known parabolic reaction law. Therefore, it is usually better practice to remove material by repeated oxidation-chemical etching process steps wherein the oxidation is limited to periods of from 2 to 4 hours rather than oxidizing all of the material to be removed in one step wherein a protracted period of time will be required. The silicon oxide is then removed by etching with hydrofluoric acid.

A second preferred method of removing material from the surface 20 is by the employment of chemical etching only. The chemical etching is carried out at an elevated temperature of from 800° C. to 1100° C., with 900° C. being preferred.

The chemical etchant is either chlorine gas or a mixture of chlorine and oxygen gases. The chlorine gas, at the elevated temperature, reacts with the silicon carbide to form carbon and silicon tetrachloride which passes off as a gas. The oxygen gas is added to the chlorine gas to react with the carbon producing carbon monoxide and carbon dioxide, both gases, which are removed by flowing an excess of chlorine gas or a diluent gas across the surface 20. A suitable diluent gas is argon. Preferably, argon should be present as a diluent gas as it retards the chlorine etching rate without negative side-effects.

Suitable gaseous chemical etchant compositions range from 60% to 90% by volume of chlorine and from 10% to 40% by volume of oxygen. A preferred composition is 85% by volume chlorine and 15% by volume oxygen. Argon is added to these compositions at a volume ratio ranging from 1:1 to 4:1, argon to gaseous etchant.

A preferred ratio is 3 volumes of argon gas to 1 volume of chlorine-oxygen gaseous mixture.

Due to the slightly polar nature of the Si and C bonding in SiC, the two surfaces 20 and 22 of a silicon carbide body 12 will behave differently under various chemical and physical treatments. For example, if a silicon carbide body 12 is etched in molten $Na_2O + NaOH$, one surface will etch in a rough pattern while the other will etch smooth. The former is called the "carbon" surface. The "carbon" surface will also oxidize from 10–100 times faster than the silicon surface. The two surfaces may be differentiated by the chemical etching or oxidation techniques, or by other methods well known in the art.

Thus, in the preferred procedure for removing material from the SiC body, the surface 20, should be the "carbon" surface.

In affixing electrical contacts to the top surface 20, one must exercise care that the process does not accidentally short the contact to the n-type region. Should a short circuit occur, the device is inoperative. To prevent the accidental shorting from occurring, other planar type devices make acceptable radiation detection devices.

Figure 3:
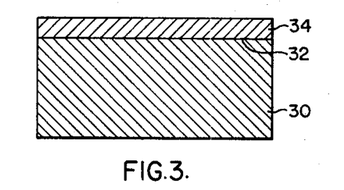

One type of planar device is prepared from a body of n-type silicon carbide which is lapped and polished until the two major surfaces are parallel to each other. Employing molten $Na_2O + NaOH$, the "carbon" surface of the body is determined. Employing any suitable means known to those skilled in the art a layer of silicon oxide is disposed on the "carbon" surface of the body. The layer is from 0.1 to 4 microns in thickness. With reference to FIG. 3 there is shown a layer 34 of silicon oxide disposed on a "carbon" surface 32 of a body of silicon carbide.

Employing any suitable masking agent known to those skilled in the art, such, for example, as one commercially available and sold under the trade name Kodak Metal Etch Resist, the outer peripheral portion of the layer 34 is masked and the unmasked central portion of the layer 34 is removed by chemically etching the silicon oxide with hydrofluoric acid exposing a portion of the silicon carbide of the body 30. A preferred portion of the silicon carbide of the body 30 is then removed with a mixture of chlorine and oxygen gases diluted with argon gas leaving regions having a width from 50 to 100 microns wide at the periphery.

Various mixtures of chlorine and oxygen gases by volume flowing for approximately one hour at 900° C. have been found sufficient to etch the silicon carbide from the unmasked portion of the body 30. After removal of the masking material the remaining layer 34 of silicon oxide is removed by etching with hydrofluoric acid.

The body 30 of silicon carbide is then subjected to a suitable doping process and a layer 36 of p-type semiconductivity is created about a central core 38 of n-type semiconductivity of the original body 30 thereby forming a p-n junction 40. Aluminum is a preferred doping material for establishing the layer 36.

The diffused body is then subjected to a repeated process of chemical etching by chlorine gas until the desired junction depth is obtained. Chemically etching the diffused body with chlorine gas is preferably done at a temperature of about 900–1050° C. Process checks must be made during the etching process to prevent removal of the entire layer 36. The undesired side and bottom portions are removed by scribing and breaking or by lapping and polishing.

With reference to FIG. 6 there is shown a completed radiation detection device 42. An electrical contact 44 is affixed to the layer 36. Suitable means must be employed to prevent accidental shorting from occurring between the contact 44 and layer 38. One suitable means for affixing the contact 44 to the layer 36 employs metal vapor deposition of a "sandwich" of tantalum, gold, and tantalum on the layer 36 and subsequent alloying of the sandwich materials. Another electrical contact 46 comprising a metal selected from the group consisting of molybdenum, tantalum, tungsten and base alloys thereof is affixed to the layer 38 by any suitable means such for example as an electrical solder material. The electrical contact 46 may also be affixed to the region 38 on the same major surface of the device as the electrical contact 44.

Figure 7:
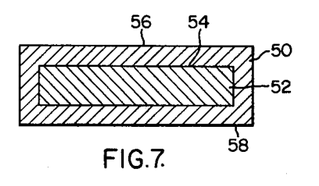
FIGS. 7 through 10 are views in cross section of a device being prepared in accordance with the teachings of this invention.

In another process for making a radiation detector device, a body of silicon carbide having n-type semiconductivity is diffused with an acceptor impurity such, for example, as aluminum to establish a region of p-type semiconductivity. The resulting structure is shown in FIG. 7 where a region 50 of p-type semiconductivity silicon carbide encapsulates a region 52 of n-type semiconductivity silicon carbide. A p-n junction 54 divides the regions 50 and 52 of semiconductivity.

Surfaces 56 and 58 are major surfaces lapped and polished to parallelism. Surface 56 is the "carbon" face having been determined by etching the body of silicon carbide in molten $Na_2O:NaOH$. The thickness of the region 50 may be as great as 50 microns.

Figure 8:
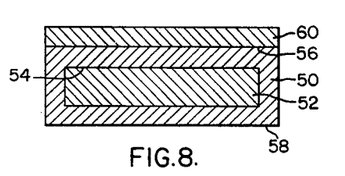

Employing a suitable means known in the art such, for example, as vapor deposition in a horizontal flow furnace followed by an oxidation process, a layer 60 of silicon oxide 0.1 to 4 microns in thickness is disposed on the surface 56. The resulting structure is shown in FIG. 8.

Figure 9:
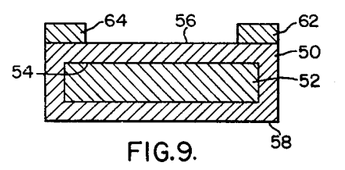

FIG. 9 is a view of the structure after selective portions 62 and 64 of the layer 60 has been protected by a mask, such, for example, as a mask prepared by use of a commercially available product sold under the trade name Kodak Metal Etch Resist, while the remainder of the layer 60 was removed by etching the material in hydrofluoric acid. The remaining selective portions 62 and 64 act as masking agents for selective portions of the layer 50 in a further process step.

The surface 56 which is not protected by the masking portions 62 and 64 of silicon oxide is exposed to a mixture of chlorine and oxygen gases and the silicon carbide is removed by gaseous chemical etching reaction until the p-n junction 54 is at a predetermined distance beneath the etched surface 56. The unwanted portions of the regions 50 and 52 are removed by any suitable means such for example as scribing, breaking the material off and cleaning the surfaces thereafter by suitable means. The portions 62 and 64 of silicon oxide are removed by an etching solution of hydrofluoric acid.

Figure 10:
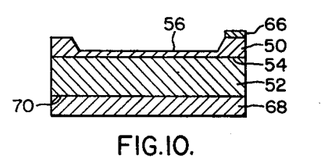

A first electrical contact 66 comprising such, for example, gold, aluminum, silver and base alloys thereof, is affixed to the peripheral portion of the region 50. The contact may be affixed by vapor deposition or by alloying as the peripheral portion of the region 50 is thick enough to prevent accidental short circuiting to occur between the contact 66 and the region 52. A second electrical contact 68 comprising such, for example, molybdenum, tungsten, tantalum and base alloys thereof is affixed to a major surface 70 of the region 52 by such suitable means as employing electrical solders and brazing materials. The structure of the completed device is shown in FIG. 10.

Figure 11:
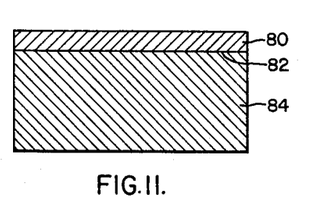
FIGS. 11 through 15 are views in cross section of a device being prepared in accordance with the teachings of this invention.

Another method of preparing a radiation detection device is to lap and polish to parallelism a body of n-type silicon carbide material. After determining which major face is a "carbon" face, a layer of silicon oxide is disposed on the "carbon" face of the body by any suitable means known to those skilled in the art. The structure is shown in FIG. 11. The layer 80 of silicon oxide is shown disposed on the "carbon" face 82 of the body 84 of n-type semiconductivity.

Figure 12:
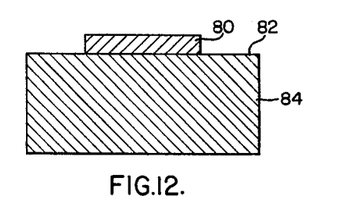

With reference to FIG. 12, a portion of the layer 80 has been removed by preferential etching. A masking material is disposed on a portion of the layer 80 which is to be retained on the surface 82. A suitable masking material is obtained commercially on the open market as Kodak Metal Etching Resist (KMER). The undesired and unmasked portion of the layer 80 is removed by chemically etching the material in a hydrofluoric acid solution. The protective mask of KMER is removed by dissolving the mask in boiling trichloroethylene.

Figure 13:
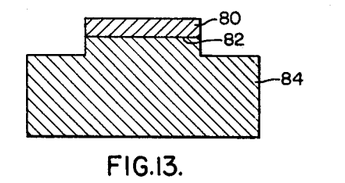

The remaining silicon oxide layer 80 acts in turn as a mask for a portion of the surface 82 of the body 84. A mixture of chlorine gas and oxygen gas is caused to flow over the unmasked portions of the surface 82 at a temperature of 900° C. thereby chemically etching away the silicon carbide exposed to the gas mixture. The resulting structure is shown in FIG. 13. The amount of silicon carbide removed is determined by the composition of the gas mixture and the total time of flow of the mixture.

Figure 14:
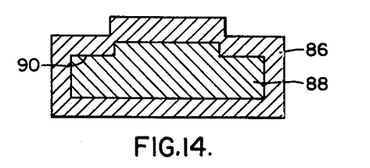

The remaining layer 80 of silicon oxide is removed by chemically etching the layer 80 in a solution of hydrofluoric acid. A region 86 of p-type semiconductivity, is then formed in the body 84 completely surrounding the remaining region 88 of n-type semiconductivity. The region 86 is formed by any suitable means such, for example, as by the diffusion of an acceptor impurity such, for example, as aluminum into the body 84 of silicon carbide. A p-n junction 90 is formed between the regions 86 and 88. The structure after diffusion is shown in FIG. 14.

Figure 15:
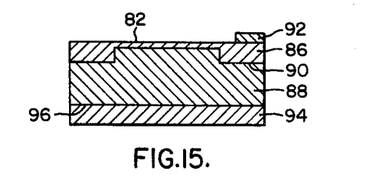

With reference of FIG. 15, the completed detection device is shown after further processing has occurred. Undersired portions of the regions 86 and 88 are removed by any suitable means such for example as by chemical etching, scribing and breaking, and lapping and polishing. A first electrical contact 92 comprising such, for example, as gold, silver, tantalum and base alloys thereof, is affixed to an outer peripheral portion of the region 86, the p-n junction 90 being at its greatest distance from the surface 82 at that point. The contact 92 may therefore be alloyed to the region 86 without fear of having a direct electrical short circuit occurring with the region 88. A second electrical contact 94 comprising such, for example, molybdenum, tantalum, tungsten and base alloys thereof is affixed to a major surface 96 of the region 88.

In all the devices the selection of n-type silicon carbide is made since the diffusion of acceptor impurities into n-type silicon carbide is more well known and the diffusion process more easily controlled.

Also, in all the devices the major proportion of the p-n junction is fabricated to be approximately 1 micron or less from the surface of the device to be purposely exposed to the source of radiation.

The following examples are illustrative of the teachings of this invention.

A body of n-type semiconductivity silicon carbide having a resistivity of 1 ohm-centimeter was prepared in accordance with the teachings of U.S. Patent 3,275,415 and assigned to the same assignee as this patent application. The body was lapped and polished until the basal plane surfaces were parallel to each other. The body was then cleaned ultrasonically in first hydrofluoric acid, then a mixture of hydrochloric and nitric acids followed by a rinsing in first acetone and then water.

The body was placed in a flowing gas furnace for diffusion in accordance with teachings of U.S. Patent 3,082,126 assigned to the same assignee as this patent specification. A gaseous mixture comprising 95% argon and 5% hydrogen was caused to flow first over hyper pure aluminum heated to a temperature of from 1300° C. to 1400° C. and then over the body which had been heated to a temperature of 1900° C. The gas flow was continued for 10 hours to form a region of aluminum diffused silicon carbide having a p-type semiconductivity.

The body was removed from the furnace. An examination showed that aluminum had been diffused through all the surfaces into the body to a depth of 8 microns. Employing the oxidation teachings or etching methods the opposed surfaces were checked to determine which one was the "carbon" surface. Having determined the "carbon" surface, the aluminum diffused region was removed from all parts of the body except the "carbon" surface.

The body was exposed to wet argon at a temperature of 1200° C. for 8 hours. Approximately 1 to 2 microns of silicon carbide of the "carbon" face was oxidized silicon oxide. The silicon oxide so formed was removed by etching the body in hydrofluoric acid. Employing the junction delineation method of oxidation and electrolytic etching, the p-n junction was shown to be 6.5 microns beneath the "carbon" surface. Oxidation and etching was continued until the p-n junction was less than 1 micron from the "carbon" surface.

An electrical contact comprising an alloy of gold, tantalum and aluminum was deposited on the "carbon" surface of the body by vapor deposition or by thin alloy preforms and affixed to the body by heating the contact and the body to 1200° C. A tungsten electrical contact was affixed to the other surface of the body using a gold tantalum alloy to complete the detection device.

The top surface of the device was of high resistivity, since most of the diffused p-type layer had been removed. This high resistivity surface makes the finished device have a high impedance. The surface was made low resistivity by diffusing the body with aluminum (before the electrical contacts are applied) for several minutes at 2000° C. Such diffusion did not appreciably change the junction depth, but did form a high conductivity surface.

Figure 16:
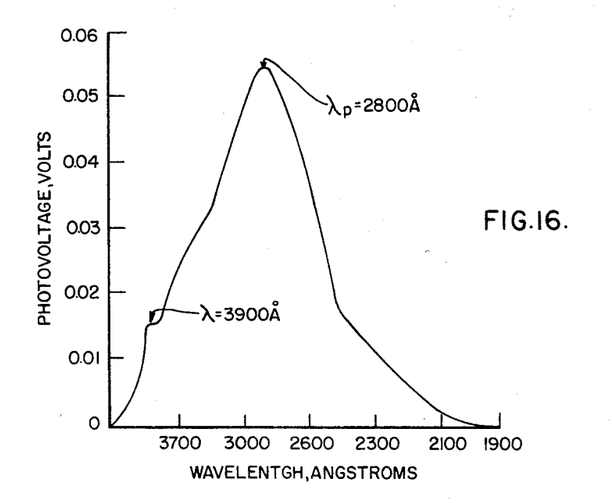
FIG. 16 is a plot showing the variation of the photovoltage with respect to wavelength of a radiation detection device embodying the teachings of this invention.

The device was exposed to a source of illumination at room temperature and its response to the radiation emanating from the source was determined electrically by noting the photovoltage of the device at various wavelengths of the spectrum produced by the source. The results are shown graphically in FIG. 16. The peak wavelength $\lambda_p$ of the device was 2800 A.

In a similar manner other silicon carbide devices were fabricated. Each device was evaluated to determine the depth of the p-n junction from the surface to be exposed to radiation. The junction was delineated by oxidation or electrolytic etching and the depth was determined by optical microscopy. The depth of the p-n junction was determined at six different locations of the periphery of the body 12. The peak wavelength $\lambda_p$ was determined for each device in the same manner as the original device.

Figure 17:
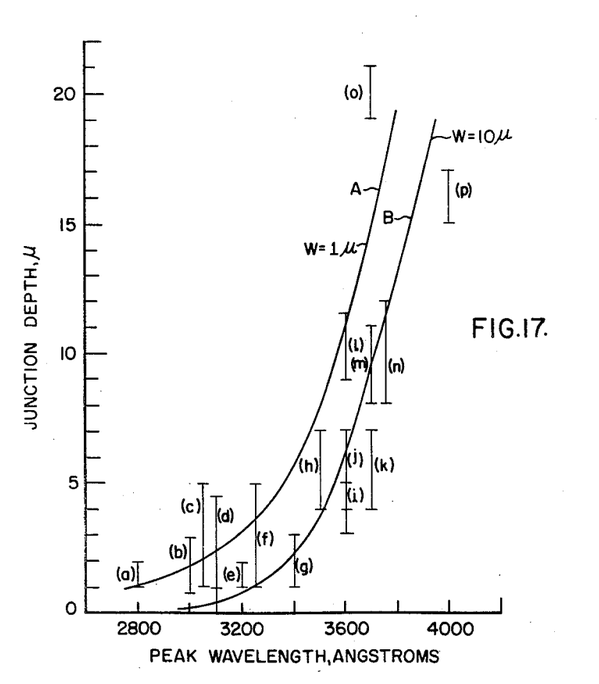
FIG. 17 is a plot showing the variation of the peak wavelength with respect to the junction depth at room temperature.

FIG. 17 is a graph representing the peak wavelength $\lambda_p$ exhibited by each of the detectors at room temperature as a function of the measured junction depth of each corresponding device. Superimposed on this graph data are calculated curves, A and B, which have been derived from Equation 2 in which the theoretical effective depletion width W was assumed to be equal to 1 micron for curve A and 10 microns for curve B. The majority of these devices are included within the two curves A and B.

It is to be noted that as the junction depth increases, $\lambda_p$ increases, that is, the peak response occurs at longer wavelengths. When the junction depths are greater than 6 to 8 microns, relatively little change is noted in the peak wavelength. When the junction depth is near 1–2 microns, a relatively modest change in the junction depth causes a large change in the peak wavelength.

Figure 18:
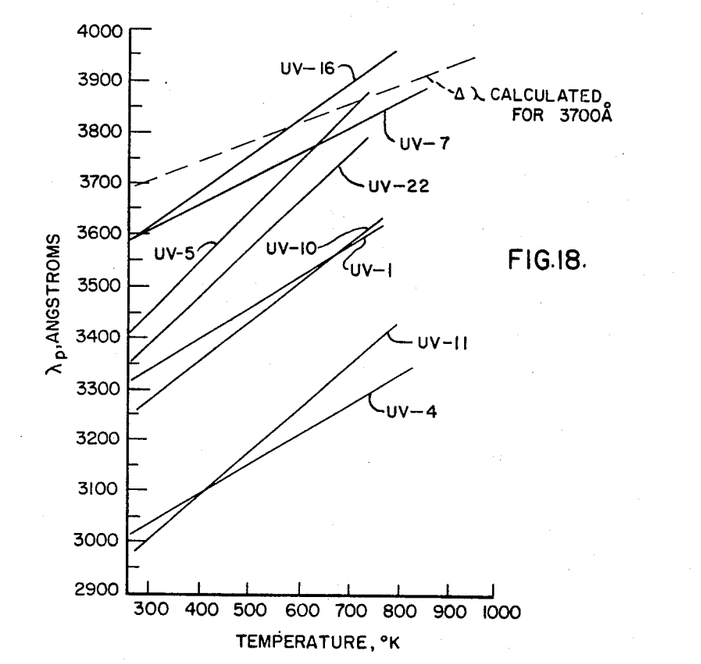
FIG. 18 is a plot showing the variation of the peak wavelength of several devices embodying the teachings of this invention with respect to the change in temperature of the corresponding device.

Several of the devices were then heated to elevated temperatures, exposed to radiation from a source of illumination and their peak wavelength response, $\lambda_p$, determined at each elevated temperature test point. The peak wavelength response $\lambda_p$, as a function of temperature for each device is shown in FIG. 18.

It is to be noted that devices having a shorter peak wavelength response, $\lambda_p$, at room temperature are more sensitive to a temperature change than those devices having a longer peak wavelength response $\lambda_p$, at room temperature.

Silicon carbide devices embodying the teachings of this invention are very desirable for employment in combustion control system since the spectrum of most combustion flames contain ultraviolet light. The ability of silicon carbide devices, particularly those with shallow junctions, to detect ultraviolet radiation enables one to employ such a device for detecting the presence of a flame in a combustion system. Since the device generates a voltage in the presence of ultraviolet radiation, suitable means can be employed to utilize the generated voltage to visibly show on a combustion control board panel the presence or absence of a flame. In the absence of a flame a suitable electrical system means may be employed whereby the combustion system can be turned off and an audible signal can be activated to alert personnel engaged in controlling the activities of the combustion system.

The detector described above is particularly useful in burner control systems since it is sensitive mainly to ultraviolet radiation. If it were sensitive to infrared and visible radiation as well as ultraviolet, radiation from a hot background would generate a voltage in the device even if the flame were out. Thus if sensitive to all energies, the device would be slow acting and not indicate absence of a flame, but absence of heat.

Figure 19:
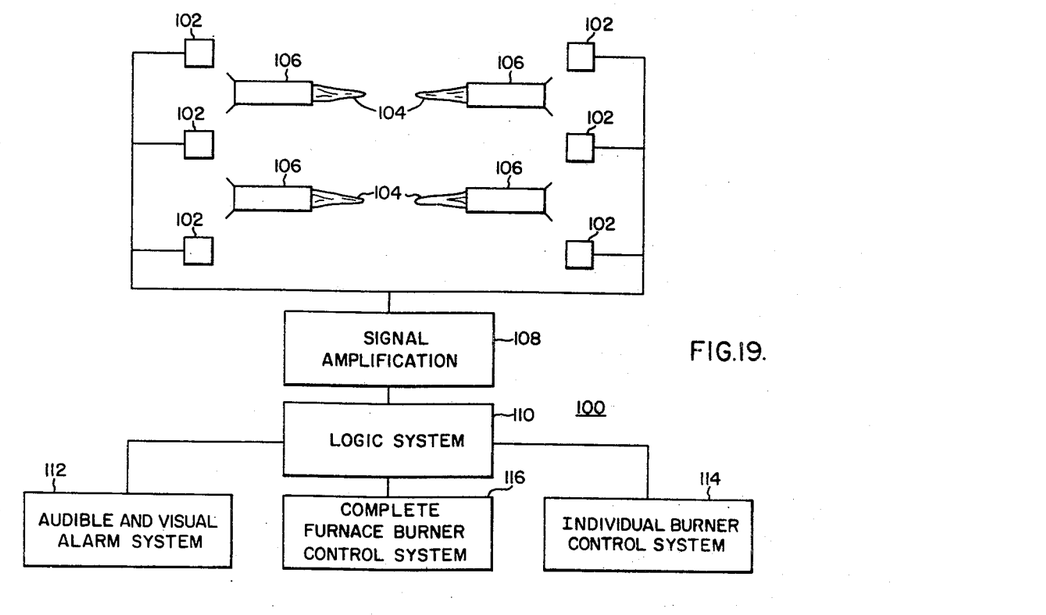
FIG. 19 is a schematic of a furnace control system embodying the silicon carbide ultraviolet radiation detector device of this invention as a flame scanner.

With reference to FIG. 19, there is shown a schematic of a furnace control system 100 utilizing silicon carbide ultraviolet radiation detector devices 102. The devices 102 function as flame scanners and provide a method of monitoring an individual burner flame 104 in a multiburner furnace or boiler. The devices 102 are oriented to scan or view the area where combustion air first meets with the fuel of a burner 106 to produce the flame 104. This area is the only point where ultraviolet radiation is generated. The devices 102 are only responsive to a flame which is a source of ultraviolet radiation and are not responsive to other flames which are sources of other forms of radiation such, for example, as infrared radiation. Consequently, when the burner flame 104 which is the source of ultraviolet radiation is extinguished, the radiant energy emitted from the hot walls of the furnace does not affect the devices 102 and therefore does not produce a false indication that the burner flame 104 although extinguished, is still burning.

The ultraviolet radiation detector devices 102 may be mounted either within the combustion chamber or outside of the combustion chamber of the furnace or boiler. The devices 102 are capable of withstanding temperatures up to approximately 500° C., therefore the choice of location of the devices 102 is a matter only of choice or system control desirability. In all instances, however, no lens system is required to concentrate the energy generated by the source of ultraviolet radiation energy in order to make the devices operative.

Care must be exercised to prevent ash from accumulating on the surface of the devices 102 "sensing" the source of ultraviolet radiation energy. An accumulation of ash functions as a mask on the surface and makes the device 102 less sensitive to ultraviolet radiation.

The signal generated by each of the devices 102 is of a very low voltage and must be amplified within a signal amplification unit 108. The degree to which the generated signal is amplified is dependent upon the furnace functions one desires to be automatically controlled by or responsive to the generated signal. These desired furnace functions comprise a logic system 110 which is responsive to the amplified signal of the signal amplification unit 108.

The logic system 110 may comprise three basic subsystems such, for example, as an audible and visual alarm system 112, an individual burner control system 114 for automatically controlling the combustion air and fuel required for each individual burner in the furnace and a complete furnace burner control system 116.

The audible and visual alarm system 112 is means whereby a portion of the amplified signal or the lack of an amplified signal informs a furnace operator the status of each individual burner in the furnace. Should a burner which is operating normally as required suddenly have its flame extinguished, an audible alarm may be caused to be sounded and an appropriate visual signal initiated to inform a furnace operator that a flameout has occurred and to indicate which burner is affected.

Interconnected with the alarm system 112 is the individual burner control system 114. Should a flameout occur on a burner one may not want to waste combustion air and fuel until they can be manually turned off. By suitable electrical means one may automatically stop the feeding of combustion air and fuel to burner when its flame is extinguished at the same time that the alarm system 112 is initiated by the burner flameout.

Additionally, if trouble originates in the form of several burners experiencing flameouts at the same time, it may be necessary to extinguish all burner flames and to stop the flow of all combustion air and fuel to the furnace. This complete furnace control system 116 is interconnected with the individual burner control system 114 so that when a predetermined number of burners have had their flames extinguished simultaneously for any reason, all the remaining burner flames will be extinguished and the flow of combustion air and fuel stopped.

One therefore should note that many various furnace control systems are possible depending upon need, function and cost.

The principal advantage of the silicon carbide detection devices 102 is that no high voltage leads are required by them. Prior art ultraviolet radiation detection devices require 700-volt leads directly to the furnace chambers. Enough current is present in these leads to make the area surrounding these leads and associated equipment hazardous work areas for furnace personnel. This is not true of the devices 102. Only a small signal voltage is generated which does not present the hazardous electrical situation heretofore encountered by furnace personnel.

Additionally, prior art flame sensing devices was able to withstand approximately 300° F. continuously. The detection devices 102 provide a threefold increase in thermal ambient capability, being able to withstand continuous exposure at a temperature of approximately 1000° F.

Another useful application of silicon carbide devices embodying the teachings of this invention is the detection of explosions through exposure to ultraviolet radiation generated by the explosion.

Additionally, silicon carbide devices heretofore described may be employed to detect a flame and trigger, a fire alarm system and/or a sprinkling system in industrial areas such, for example, as warehouse facilities.

As exemplified by the burner control system, any ultraviolet radiation detection system utilizing a silicon carbide radiation detection device will, because of the low electrical signal generated by the silicon carbide device, require some means to amplify the generated electrical signal. This amplified electrical signal must be sufficient to operate the desired logic system which is responsive to the generated electrical signal.

It is apparent to anyone that the processes described herein to produce a simple diode sensitive to ultraviolet radiation are also applicable to manufacturing other silicon carbide devices. Integral designs of silicon carbide devices having more than one p-n junction and complex p-n junction structures contained therein can be processed in accordance with the teachings of this invention. The resulting silicon carbide structures may be designed to operate functionally as a multi-junction detection device or as a rectifying or a switching device or as combinations thereof.

Figure 20:
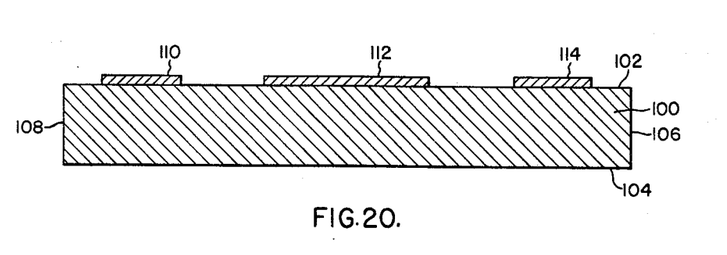
FIGS. 20 through 23 are views in cross section of a body of silicon carbide being processed in accordance with the teachings of this invention.

With reference to FIG. 20 there is shown a body of silicon carbide 100 having a top surface 102, a bottom surface 104 and side surfaces 106 and 108. Masking layers 110, 112 and 114 of silicon oxide have been formed on the top surface 102 in the same manner as previously described herein.

Figure 21:
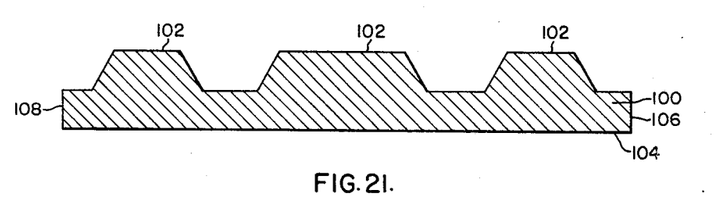

The surface 102 is then etched with a gaseous reactant mixture consisting of chlorine, oxygen and argon. After the etching process has been completed, the silicon oxide masking layers 110, 112 and 114 are removed by etching with hydrofluoric acid. The resulting structure is shown in FIGURE 21.

Figure 22:
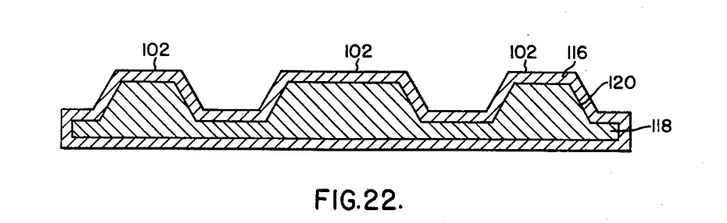

The body 100 of silicon carbide is then subjected to a diffusion process to create two regions of different type semiconductivities, with a p-n junction formed therebetween. For example, if the body 100 is of n-type semiconductivity, a suitable p-type dopant, such, for example, as aluminum, is diffused into the body 100 to form regions 116 and 118 of p-type semiconductivity and n-type semiconductivity respectively. A p-n junction 120 is formed therebetween. The resulting structure is shown in FIG. 22.

Figure 23:
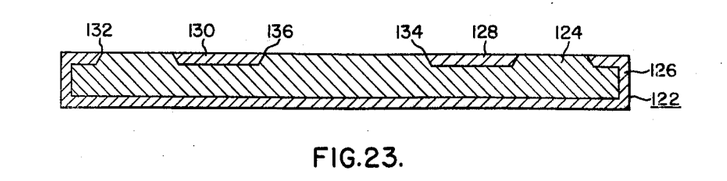

With reference to FIG. 23 there is shown a silicon carbide element 122 made by lapping and polishing the remaining portions of the surface 102 of the structure shown in FIG. 23. The structure consists of a plurality of junction structures all formed from the original two regions 116 and 118 of semiconductivities and the p-n junction 120. The structure consists of a region 124 of n-type semiconductivity, regions 126, 128 and 130 of p-type semiconductivities and p-n junctions 132, 134 and 136.

While the invention has been described with reference to particular embodiments and examples, it will be understood, of course, that modifications, substitutions and the like may be made therein without departing from its scope.

We claim as our invention:

1. A semiconductor device comprising
    a body of silicon carbide semiconductor material having a top surface and a bottom surface;
    a pair of regions of different type semiconductivities within the body of silicon carbide, said regions having a p-n junction therebetween, at least one of said regions having a surface comprising at least a portion of said top surface of said body, at least a major portion of the p-n junction being disposed at a distance no greater than 10 microns from said top surface, whereby said portion of said p-n junction has a peak response to a predetermined wavelength within the ultraviolet radiation portion of the spectrum when said top surface of said body is exposed to radiation; and an ohmic electrical contact affixed to the first region and the second region whereby to enable a potential to be conveyed therefrom to an electrical device upon the predetermined ultraviolet radiation impinging on the top surface.

2. The semiconductor device of claim 1 in which a selected portion of the p-n junction most sensitive to ultraviolet radiation is no greater than 3 microns from the top surface of said body.

3. The semiconductor device of claim 1 including
the end portions of said p-n junction terminating in said top surface.

4. The semiconductor device of claim 1 in which
said p-n junction is substantially parallel to said bottom surface, and
said top surface comprises two portions, one of said portions being greater than 10 microns from said p-n junction.

5. The semiconductor device of claim 1 in which
said top and said bottom surfaces are substantially parallel to each other,
said p-n junction comprises at least two portions, each of said portions being substantially parallel to said bottom surface, only one of said portions being no greater than 10 microns from said top surface.

6. An ultraviolet radiation detection system comprising
at least one silicon carbide diode having a body of silicon carbide semiconductor material having a top surface and a bottom surface; a pair of regions of different type semiconductivities within the body of silicon carbide, said regions having a p-n junction therebetween, at least one of said regions having a surface comprising at least a portion of said top surface of said body, at least a major portion of the p-n junction being disposed at a distance no greater than 10 microns from said top surface, whereby said portion of said p-n junction has a peak response to a predetermined wavelength within the ultraviolet radiation portion of the spectrum when said top surface of said body is exposed to radiation; and an ohmic electrical contact affixed to the first region and the second region whereby to enable a potential to be conveyed therefrom to an electrical device upon the predetermined ultraviolet radiation impinging on the top surface;
means for amplifying an electrical output from said diode; and
a logic system responsive to said amplified electrical output.

7. The ultraviolet radiation detection system of claim 6 in which the p-n junction is disposed at a distance no greater than 3 microns from the top surface of the diode.

8. In combination, a fuel combustion system and an ultraviolet radiation detection system comprising
a combustion chamber,
at least one silicon carbide diode disposed to view said chamber,
said silicon carbine diode having a body of silicon carbide semiconductor material having a top surface and a bottom surface; a pair of regions of different type semiconductivities within the body of silicon carbide, said regions having a p-n junction therebetween, at least one of said regions having a surface comprising at least a portion of said top surface of said body, at least a major portion of the p-n junction being disposed at a distance no greater than 10 microns from said top surface, whereby said portion of said p-n junction has a peak response to a predetermined wavelength within the ultraviolet radiation portion of the spectrum when said top surface of said body is exposed to radiation; and an ohmic electrical contact affixed to the first region and the second region whereby to enable a potential to be conveyed therefrom to an electrical device upon the predetermined ultraviolet radiation impinging on the top surface;
means for amplifying said generated potential; and
a logic system responsive to said amplified potential.

9. The combination fuel combustion system and ultraviolet radiation detection system of claim 8 in which the p-n junction of each of the silicon carbide diode is disposed at a distance no greater than 3 microns from the top surface of the diode.

References Cited

UNITED STATES PATENTS

| | | | |
|---|---|---|---|
| 3,418,473 | 12/1968 | Blue. | |
| 3,351,493 | 11/1967 | Weiman et al. | |
| 3,086,147 | 4/1963 | Pounds | 250—215 X |
| 3,126,940 | 3/1964 | Lundberg | 250—215 X |
| 3,161,863 | 12/1964 | Deziel | 250—217 |
| 3,287,611 | 11/1966 | Bockemuehl et al. | |

ARCHIE R. BORCHELT, Primary Examiner

M. J. FROME, Assistant Examiner

U.S. Cl. X.R.

250—211, 215, 217; 317—235, 237